Sept. 18, 1951     W. H. RASER, JR     2,568,363
HELICOPTER
Filed Oct. 6, 1947
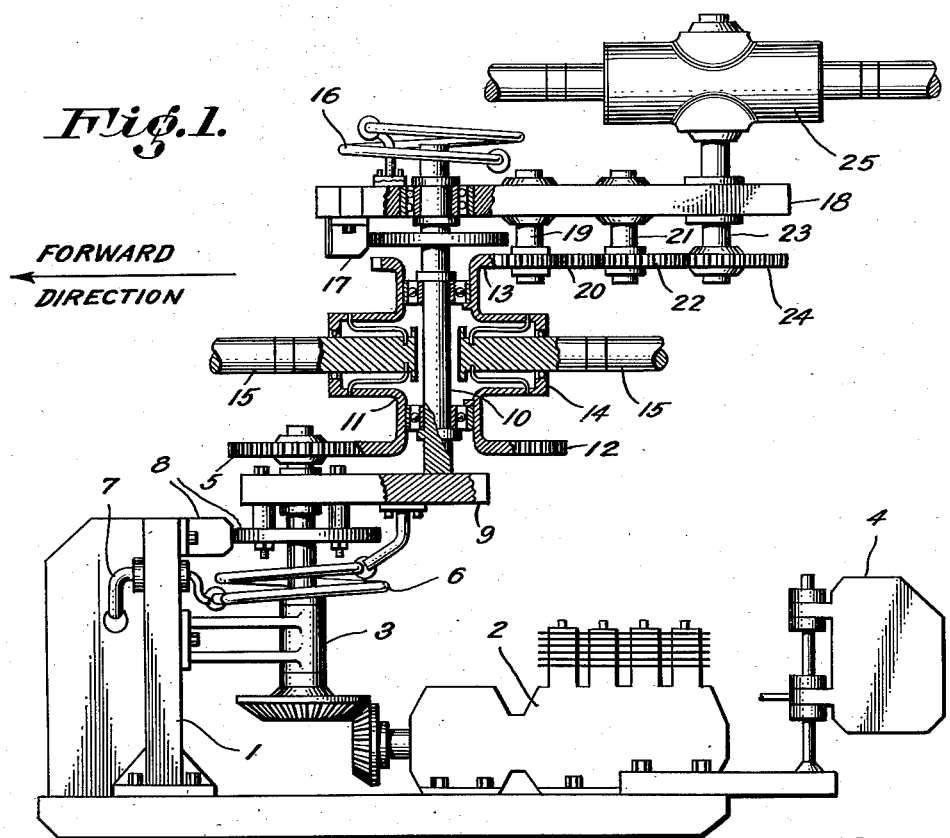
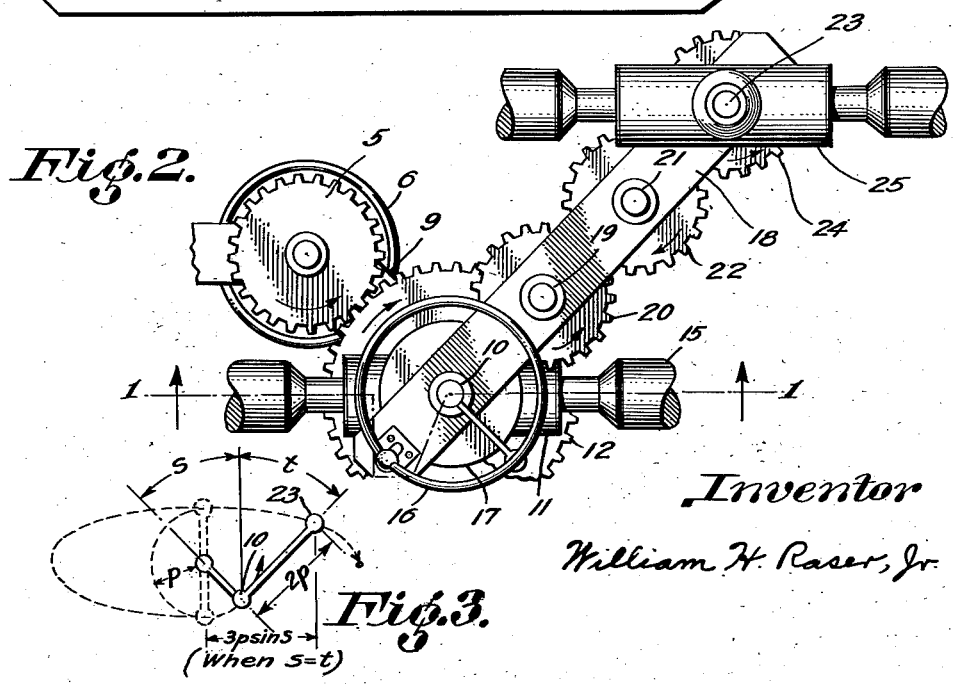
Inventor
William H. Raser, Jr.

Patented Sept. 18, 1951

2,568,363

UNITED STATES PATENT OFFICE 2,568,363

HELICOPTER

William Heyl Raser, Jr., St. Petersburg, Fla.

Application October 6, 1947, Serial No. 778,086

5 Claims. (Cl. 170—135.2)

The invention relates to improvements in rotary-wing aircraft and particularly in the transmission system and in the means of stabilization and control of said aircraft during flight.

The objects of the improvement are, first, to obtain an adequate stabilizing influence from the support or mounting of the lifting airscrews hereinafter referred to as rotors; second, to prevent a loss of the condition of adequate stability due to the pilot's manipulations of controls during flight; and, third, to profit from the reduction in demands made on the pilot resulting from the two objects above by consolidating some of the conventional channels of control into fewer and simpler controls and thereby forming a new control system which, although less maneuverable, appears adequate, and which provides for the elimination of cyclic-pitch control (controlled change of blade angle with respect to azimuth), and which thereby reduces the complexity and cost of the helicopter or other type of rotary-wing aircraft.

The means for the accomplishment of the above objects consist largely of improvements within the transmission system which supplies the rotor with lifting power.

One form of the invention is illustrated in the accompanying drawing, in which Figure 1 is a vertical section of the helicopter on line 1—1, Figure 2; Figure 2 is a plan view of the rotors; and Figure 3, a plan-view diagram of the position of the rotors.

The fuselage or plate 1, the engine or other prime mover 2, the central shaft hanger 3, and the controlled tail rudder 4 constitute the non-rotating section of the helicopter and a source of torque for the central shaft and its attached central gear 5.

Free to rotate on shaft 5 but rotationally restrained by adjustable control spring 6 and its adjusting lever 7, and by a damping means such as a rotational dashpot 8, is arm 9 to which the lower hub shaft 10 is rigidly attached. Free to rotate on shaft 10 is lower hub 11 carrying gear teeth 12 which mesh with gear 5, a pass gear 13, and retention barrels 14—14 for a number of blades 15—15. Although the blades could be rigidly mounted or could be allowed what is commonly known as flapping articulation, only feathering articulation is illustrated; that is, the hub barrels 14—14 provide automatic control of collective pitch change (simultaneous change of blade angle of all blades) in order to reduce the variation in R. P. M. An example of a means of providing this feature is described in Letters Patent of the United States numbered 1,907,504.

Free to rotate on shaft 10 and rotationally restrained by spring 16 and annular dashpot 17, is the upper arm 18 into which are mounted three shafts as follows: auxiliary shaft 19 carrying gear 20, auxiliary shaft 21 carrying gear 22, and upper hub shaft 23 on which are rigidly mounted the hub gear 24 and the upper hub 25.

Gears 13, 20, 22, and 24 mesh each with the next respectively and transmit power from the lower rotor 11 to the upper, 25. The lower rotor is driven by central gear 5. This arrangement provides for the rotation of the rotors in opposite directions. It also provides two special features, one pertaining to control of the center of lift, and the other pertaining to inherent stability.

Control of the position of the center of lift is provided in this arrangement by the effect of the gear tangential forces on the arms 9 and 18. If a tangential load is applied to any gear, the gear transmits an equal and opposite force on the shaft or other mounting, due to Newton's laws. Therefore, whenever power is transmitted to the rotors, shaft 10 receives a force which is perpendicular to both it and the length of arm 9. Likewise, shafts 19, 21, and 23 receive forces perpendicular to them and to arm 18, two directed oppositely from the third. All of these shaft forces are transmitted by the various shafts to arms 9 and 18 which are thereby caused to tend to rotate about their respective pivotal shafts 5 and 10. If the direction of rotation is that indicated by the arrows on the gears in Figure 2, the tendency toward rotation of the arms is in the direction which would move shafts 19 and 23 aft; that is, in the direction which would tend to increase the angles between lateral axes and the lengths of the lower and upper arms, these angles being angles $s$ and $t$ respectively in Figure 3.

The said tangential gear forces, which determine the position of the center of lift of the two rotors, are controlled by the pilot's manipulation of only the engine throttle and the lower spring adjustment 7. The throttle controls the engine torque which, if springs 6 and 16 are linear, is proportional to both $s$ and $t$ of Figure 3. The spring constants of springs 6 and 16 bear such a ratio that the changes of $s$ and $t$ with respect to change of engine torque are equal and that angles $s$ and $t$ themselves are equal if lever 7 is held in one certain position. The two rotors are designed with their lifting forces as nearly equal as possible; hence, the center of lift of this helicopter is considered to be the midpoint of arm 18. Assuming the at least possible if not desirable position of the center of gravity as lying directly under shaft 5, and using $p$ to indicate the shaft-to-shaft length of arm 9, the lower hub lies aft of the center of gravity a distance $p$ times sine $s$. The shaft-to-shaft length of the upper arm 18 is made $2p$ or twice that of the lower arm. With $s$ and $t$ equal, the upper shaft 23 lies aft of the center of gravity a distance $$3p \sin s$$

as shown in Figure 3. By averaging this figure with that of the lower rotor, the center of lift is found to lie aft of the center of gravity a distance $$2p \sin s$$

where $s$ varies all the way from $-180$ degrees at power off to somewhere between 45 and 90 degrees at full throttle.

The power-off condition is represented by the heavy broken lines of Figure 3 and occurs after engine failure. During autorotative descent, some forward velocity might be obtained from negative engine torque by partial clutching of the dead engine; if this is not satisfactory, additional control must be introduced by making springs 16 pilot-adjustable.

The light broken lines of Figure 3 show the loci of the hub centers as the engine torque is increased from zero to maximum. In this range, the only possible hoverable condition is reached when $s$ is zero and this condition is reached at a reduced engine power value of between two-thirds and five-sixths of full power, depending on the above-mentioned limits of angle $s$, Figure 3. Since this is not enough power for hovering, the machine is not expected to hover. This is important in the consideration of stability; during hovering, the stabilizing feature of this invention is at a minimum.

The most important feature of this invention is the stabilizing effect of the yieldably-restrained rotor hubs which generally are free to move both longitudinally and laterally. This feature makes it possible for a skilled helicopter designer to select reasonable physical and dynamic parameters insuring the positive establishment of the condition of inherent stability. This can be substantiated by application of the theories of dynamics, but the analysis is prohibitively lengthy for these letters.

However, by admitting inaccurate terminology and using analogies, the following description of the stability feature can at least partially explain the source of the stabilizing effect.

Briefly, a helicopter is considered inherently stable if, while flying without a pilot, it were caused to tilt about a horizontal axis, it would either right itself perfectly or would oscillate about that axis in ever-decreasing cycles. If it took an infinite time to return or if the said cycles persisted with unchanging magnitude, the condition would be called neutral stability.

A necessary condition of inherent stability is that some element of corrective dissymmetry must occur between the first and second quadrants of any oscillation. In general, the angular momentum provides a non-correcting dissymmetrical element, and stability is achieved through its reduction at the end of the first quadrant, or quarter of a cycle, measured from an untilted central position.

Angular momentum accumulates during the fourth and first quadrants as rotor drag opposes and finally reverses the tilting which started off the fourth quadrant. By the end of the first quadrant, the reversed tilting and the drag have completely stopped all horizontal motion, but angular velocity is not zero as it should be for the first and fourth quadrants to be symmetrical, and hence, for the first and second quadrants to be symmetrical. Instead, the angular velocity is maximum, having been preceded by two quadrants of tilt-reversing moment without change of sign. Therefore, in an unstable machine, this tilt-reversing moment expands itself with each cycle.

In this invention, however, the rotor yields. As soon as an initial tilt causes horizontal motion in any direction, the aerodynamic drag of the rotors pulls the center of lift in the opposite direction to a limited extent. This creates a new moment which opposes the tilt-resisting moment just before the tilt-resisting moment completely reverses the direction of motion. If this new moment were sufficient, it would take infinitely long to stop tilting in any given direction, a characteristic of neutral stability. A helicopter which has rotor characteristics leading to neutral stability or approximating it actually performs as a perfectly stable helicopter because of the damping effects of the air.

This inherently-stable helicopter requires less attention in flight than does an unstable type and less maneuverability is needed. The following three controls are present: first, for control over pitching, a throttle, connected to engine 2, controls the longitudinal position of the center of lift; second, for control of rolling, lever 7 controls the lateral position of the center of lift; and third, for control of yawing, the first-mentioned control is used to obtain forward speed, and then rudder 4 is used.

The throttle also controls the rate of climb. Hence, there exists for each value of the rate of climb, usually only one value of forward velocity as maximum forward velocity accompanies maximum rate of climb in this helicopter. This could be changed by the addition of other controls such as a tail elevator or a manual adjustment of spring 16. It is believed, however, that simplicity of control is an advantage in a low-cost helicopter.

A second form of this invention is the arrangement of two rotors on separate equal-length arms which pivot around coaxial vertical shafts, one placed above the other.

I am aware that prior to my invention, helicopter control means both have been combined with the power transmission system and have been combined with means which at least partially introduce inherent stability during at least some conditions of flight. I therefore do not claim either combination broadly; but I claim:

1. The combination, in a rotary-wing aircraft, of an aircraft body, mounting means secured to said body and arranged to provide a primary vertical axis in fixed relation to said body, a first lifting rotor arranged for rotation about a first rotor axis, a second lifting rotor arranged for rotation about a second rotor axis, a first means connecting said first rotor to said mounting means and arranged to permit swinging of said first rotor axis at a fixed horizontal radius about said primary axis as center, a second means connecting said rotors and arranged to permit swinging of said second rotor axis at a fixed horizontal radius about said first rotor axis as center, a power source mounted on said body, means for transmitting power from said power source to said rotors, said power transmitting means being carried by said mounting means and said connecting means, resilient means interconnecting said first connecting means and said body, and resilient means interconnecting said first and second connecting means, whereby to maintain a predetermined relation between the torque supplied by the power source and the displacements of said rotor axes.

2. The combination, in a rotary-wing aircraft, of an aircraft body, mounting means secured to said body and arranged to provide a primary vertical axis in fixed relation to said body, a lifting rotor arranged for rotation about a rotor axis, a means connecting said rotor to said mounting means and arranged to permit swinging of said rotor axis at a fixed horizontal radius about said primary axis as center, a plurality of blade supporting extensions on the hub of said rotor, a blade freely journalled in each extension for rotation relatively thereto, a spring means opposing said rotation, a plurality of struts each articulated to the rotor blade and to said extension in a manner as to respond to an axial thrust of the blade by impressing directly thereon a tangential pitch-changing force sufficient to overcome said spring means at a predetermined speed of the hub, a power source mounted on said body, means for transmitting power from said power source to said rotor, said power transmitting means being carried by said mounting means and said connecting means, resilient means interconnecting said connecting means and said body, means for controlling the displacement of said rotor axis, and a second rotor arranged to oppose torque on said body.

3. The combination, in a rotary-wing aircraft, of an aircraft body, mounting means secured to said body and arranged to provide a primary vertical axis in fixed relation to said body, a first lifting-rotor hub arranged for rotation about a first rotor axis, a second lifting-rotor hub arranged for rotation about a second rotor axis, a first means connecting said first hub to said mounting means and arranged to permit swinging of said first rotor axis at a fixed horizontal radius about said primary axis as center, a secondary vertical axis in fixed relation to said first means, a second means connecting said rotor hubs and arranged to permit swinging of said second rotor axis at a fixed horizontal radius about said secondary axis as center, blade bearings radially extending from said hubs, tubular members concentric therewith and supported for relative rotation therewith, a rotor blade mounted with each tubular member, a spring means tending to maintain the blades at a low-pitch position, said spring means comprising elements disposed angularly to and circumferentially of said blades and thrustwise responsive to a predetermined rotational speed of the hub to overcome the spring means and to urge the blades towards a high-pitch position, a power source mounted on said body, means for transmitting power from said power source to said rotors, and resilient means connecting said first connecting means with both said body and said second connecting means.

4. The combination, in a rotary-wing aircraft, of an aircraft body, mounting means secured to said body and arranged to provide a primary vertical axis in fixed relation to said body, a first lifting rotor arranged for rotation about a first rotor axis, a second lifting rotor arranged for rotation about a second rotor axis, a first means connecting said first rotor to said mounting means and arranged to permit horizontal motion between said first rotor axis and said primary axis whereby said first axis is constrained to positions parallel to said primary axis, a second means connecting said second rotor to said mounting means and arranged to permit horizontal motion between said second rotor axis and said primary axis whereby said second axis is constrained to positions parallel to said primary axis, bearings mounted on the hubs of said rotors axis for receiving radially-mounted airscrew blades, said blades mounted for slight axial and rotary movement therein, and means for relating said movements comprising helically inclined thrust struts articulated at respective ends to the hubs and blades and adapted for circumferential change in inclination during said movements and means adapted to yieldingly oppose said movements.

5. The combination, in a helicopter, of a helicopter body, mounting means secured to said body and arranged to provide a primary vertical axis in fixed relation to said body, a shaft arranged for rotation about a vertical shaft axis, a lifting rotor arranged for rotation about a vertical rotor axis, a first means connecting said shaft to said mounting means and arranged to permit swinging of said shaft axis at a fixed horizontal radius about said primary axis as center, a second means connecting said rotor to said shaft and arranged to permit swinging of said rotor axis at a fixed horizontal radius about said shaft axis as center, rotor blade bearings mounted on the hub of said rotor, a blade mounted for slight axial and rotary movement therein, means for relating said movements comprising helically inclined thrust struts articulated at respective ends to the hub and blade and adapted for circumferential change in inclination during said movements and means adapted to yieldingly oppose said movement, a power source mounted on said body, means for transmitting power from said power source to said rotor, said power transmitting means being carried by said mounting means and said connecting means, resilient means interconnecting said first connecting means and said body, and resilient means interconnecting said first and second connecting means, whereby to maintain a predetermined relation between the torque supplied by the power source and the displacements of said axes.

WILLIAM H. RASER, JR.

REFERENCES CITED

The following references are of record in the file of this patent:

UNITED STATES PATENTS

| Number | Name | Date |
|---|---|---|
| 2,375,592 | Smith | May 8, 1945 |

FOREIGN PATENTS

| Number | Country | Date |
|---|---|---|
| 608,125 | France | Apr. 17, 1926 |